US010419407B2

(12) United States Patent
Daskalopoulos et al.

(10) Patent No.: US 10,419,407 B2
(45) Date of Patent: *Sep. 17, 2019

(54) SYSTEM AND METHOD FOR CONTROLLING FEATURES ON A DEVICE

(71) Applicant: Certicom Corp., Mississauga (CA)

(72) Inventors: Michael Daskalopoulos, San Francisco, CA (US); Ashok Vadekar, Rockwood (CA); David Wong, Mississauga (CA); William Lattin, Los Altos, CA (US); Daniel O'Loughlin, Aptos, CA (US); David R. Sequino, Lansdowne, VA (US)

(73) Assignee: Certicom Corp., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,978

(22) Filed: May 24, 2018

(65) Prior Publication Data
US 2018/0278587 A1 Sep. 27, 2018

Related U.S. Application Data

(60) Division of application No. 13/615,311, filed on Sep. 13, 2012, now Pat. No. 10,003,580, which is a
(Continued)

(51) Int. Cl.
H04L 29/06 (2006.01)
G06F 21/10 (2013.01)
(Continued)

(52) U.S. Cl.
CPC .......... H04L 63/0428 (2013.01); G06F 21/10 (2013.01); G06F 21/57 (2013.01);
(Continued)

(58) Field of Classification Search
CPC .................................................. H04L 63/0428
See application file for complete search history.

(56) References Cited

U.S. PATENT DOCUMENTS 5,737,426 A 4/1998 Brookner et al.
5,822,434 A 10/1998 Caronni et al.
(Continued)

FOREIGN PATENT DOCUMENTS

JP 2006060779 3/2006
JP 2007096746 4/2007
(Continued)

OTHER PUBLICATIONS

English translation of the Japanese Office Action dated May 24, 2013, from correspondingJapanese Application No. 2010-537218, dated May 24, 2013.
(Continued)

Primary Examiner — Jacob C. Coppola
(74) Attorney, Agent, or Firm — Jose Gutman; Fleit Gibbons Gutman Bongini & Bianco P.L.

(57) ABSTRACT

Trust between entities participating in an upgrade or enablement/disablement process is established and, to facilitate this remotely and securely, a highly tamper resistant point of trust in the system that is being produced is used. This point of trust enables a more efficient distribution system to be used. Through either a provisioning process or at later stages, i.e. subsequent to installation, manufacture, assembly, sale, etc.; the point of trust embodied as a feature controller on the device or system being modified is given a feature set (or updated feature set) that, when validated, is used to enable or disable entire features or to activate portions of the feature.

18 Claims, 13 Drawing Sheets

Related U.S. Application Data continuation of application No. 12/314,610, filed on Dec. 12, 2008, now Pat. No. 9,485,223.

(60) Provisional application No. 60/996,976, filed on Dec. 13, 2007.

(51) Int. Cl.
*G06F 21/57* (2013.01)
*H04L 29/08* (2006.01)

(52) U.S. Cl.
CPC .......... *H04L 63/061* (2013.01); *H04L 67/125* (2013.01); *G06F 2221/0742* (2013.01); *G06F 2221/2135* (2013.01)

(56) References Cited

U.S. PATENT DOCUMENTS

| | | | |
|---|---|---|---|
| 6,513,121 | B1 | 1/2003 | Serkowski |
| 6,640,238 | B1 | 10/2003 | Bowman-Amuah et al. |
| 6,681,017 | B1 * | 1/2004 | Matias .................. H04L 63/045 380/277 |
| 6,704,871 | B1 | 3/2004 | Kaplan |
| 6,966,002 | B1 | 11/2005 | Torrubia-Saez |
| 7,127,063 | B2 | 10/2006 | Lambert et al. |
| 7,409,561 | B1 | 8/2008 | Kolli et al. |
| 7,707,420 | B1 | 4/2010 | Little |
| 2002/0090085 | A1 | 7/2002 | Vanstone et al. |
| 2004/0128517 | A1 | 7/2004 | Drews et al. |
| 2005/0039061 | A1 | 2/2005 | Schultz |
| 2005/0086504 | A1 | 4/2005 | You et al. |
| 2005/0246549 | A1 | 11/2005 | Torrubia-Saez |
| 2005/0262418 | A1 | 11/2005 | Gehrmann |
| 2006/0020782 | A1 | 1/2006 | Kakii |
| 2006/0071981 | A1 | 4/2006 | Plunkett et al. |
| 2006/0173981 | A1 | 8/2006 | Zhang et al. |
| 2006/0200663 | A1 | 9/2006 | Thornton |
| 2007/0006150 | A9 | 1/2007 | Walmsley et al. |
| 2007/0006213 | A1 | 1/2007 | Shahidzadeh et al. |
| 2007/0033405 | A1 | 2/2007 | Menezes |
| 2007/0039054 | A1 | 2/2007 | Mulla et al. |
| 2007/0037571 | A1 | 5/2007 | Begeja et al. |
| 2007/0124590 | A1 | 5/2007 | Vanstone et al. |
| 2007/0180464 | A1 | 8/2007 | Dellow et al. |
| 2009/0086980 | A1 | 4/2009 | Glendinning et al. |
| 2009/0292926 | A1 | 11/2009 | Daskalopoulos et al. |

FOREIGN PATENT DOCUMENTS

| | | |
|---|---|---|
| JP | 2008542882 | 11/2008 |
| WO | 9818234 | 4/1998 |
| WO | 9844705 | 10/1998 |
| WO | 2006127949 | 11/2006 |
| WO | 2007056712 | 5/2007 |
| WO | 2007123893 | 11/2007 |

OTHER PUBLICATIONS

English translation of the abstract of JP2006-60779, published Mar. 2, 2006 and retrieved on Jun. 13, 2013. Mar. 2, 2006.
English translation of the abstract of JP2008542882, published on Nov. 27, 2008 and retrieved on Jun. 19, 2013. . . Nov. 27, 2008.
Search Report from corresponding European Application No. 08859208. 4; search completed Jun. 1, 2011, dated Jun. 1, 2011.
Indian Examination Report dated Jul. 8, 2016, received for Indian Application No. 4635/DELNP/2010 dated Jul. 8, 2016.
International Search and Written Opinion dated Mar. 9, 2009, in corresponding PCT patent application No. PCT/CA2009/002143.

* cited by examiner

SUM (PERMIT MASKS) − SUM (FORBID MASKS) = FEATURE SET

SYSTEM AND METHOD FOR CONTROLLING FEATURES ON A DEVICE

FIELD OF THE DISCLOSURE

The present disclosure generally relates to controlling features on a device.

BACKGROUND

Over the past 20 years electronics manufacturing companies have moved from a few highly vertical, fully integrated companies to a large number of specialized companies with modular value that depend on an outsourced business model. Offshore outsourcing of semiconductor manufacturing, operations and procurement decrease the visibility of the manufacturer into its own operations and distribution processes. As a result, the manufacturer loses control over important outsourced processes and information. This result of outsourcing has a direct negative impact on the ability of these companies to operate with maximum control and reduced risk.

Outsourcing reduces the ability of manufacturers to enforce the quality of their product in their customer's supply chain due to an increased risk of the presence of counterfeit components. The ability of a manufacturer to assure his customers the delivery of genuine products has become increasingly difficult. Counterfeit and recycled components can be inserted by the contract manufacturer at any point in the outsourcing interfaces unbeknownst to the original manufacturer. Counterfeit parts not only contribute to lost revenue but also to product returns, increased liability and brand erosion. Although less likely, counterfeiting can affect integrated device manufacturers (IDMs) as well as fabless houses.

The interdependencies introduced by outsourcing also contribute to the difficulty of manufacturers to optimally manage their supply chain, causing increased inventory liability and risk. Consistent on-time deliveries necessary to support a customer's just-in-time production strategies become compromised. Safety stock levels are increased to compensate for supply chain inefficiencies and as a result the amount of assets required to generate a given gross profit is increased. As the risks and losses continue to increase, the promised returns of outsourcing become less attractive.

FIG. 1 illustrates a possible scenario where an OEM engages a contract manufacturer to generate three types of devices or systems identified as 1, 2 and 3. Each of these devices implements a different set of features or capabilities. The contract manufacturer must manage inventory of each device type to fill OEM orders that may come in during, e.g. peak production periods. The IDM must maintain three separate product SKUs to provide the contract manufacturer with three distinct devices so the OEM can provide the end customer with product differentiation. The recurring capital costs of design development, mask sets, wafer fabrication, testing and packaging may be prohibitive when amortized over three IC devices. Moreover, considering the long manufacturing lead times and short product lifecycles, the recurring capital expense becomes more burdensome to the device manufacturer.

Maintaining the inventory of multiple device types results in risk to the device manufacturer. In one scenario, the device manufacturer may decide to carry multiple product SKUs to supply the OEM and increase the risk of overstocking a device. For example, in FIG. 1, the contract manufacturer may stock each device of type 1, 2 and 3. Over time, only device type 2 sells in the forecasted quantity. An overly optimistic volume forecast may result in the overstock of device types 1 and 3. The surplus devices may have to be written off or sold at a significant discount. In another scenario, the device manufacturer reduces the risk of optimistic volume forecasting by inserting additional time in the supply chain to manufacture each device type on an as-needed basis. Delaying the delivery of the devices may reduce the value of the finished goods, or cause the OEM to miss a market window.

There are also situations where devices are binned or categorized based on parameter testing. One example occurs when computer central processing unit (CPU) chips are differentiated based on their maximum clock frequency. Higher clock frequencies for CPUs result in increased processing capabilities. Therefore, the value of the CPU varies as some proportion of the maximum clock frequency. It is sometimes the case that the performance of an entire manufacturing lot can exceed the market volume requirements for the lower-performance variants of the devices. The device manufacturer can distribute the lower performance grade device and provide an authorised option to upgrade them by increasing the clock frequency of the device. The inability of the device manufacturer to securely authorise this upgrade deprives the device manufacturer of a revenue enforcement mechanism. Another potential loss of revenue to the device manufacturer arises due to warranty claims for parts in modified systems that have been upgraded to clock frequencies higher than the CPU device has been rated for. The result of this unauthorised upgrade is that the device operates out of specification and may be subsequently damaged due to thermal stress or operate unexpectedly due to a failure mode caused by a timing violation.

There are traditional methods of device specific feature provisioning based on wire bonding, laser fuses, and zero ohm resistors. These types of connections can be added or removed in the manufacturing process by contract manufacturers, during distribution by resellers, or after market by the end user. In these cases, the device manufacturer typically cannot enforce payment for the higher value, unsanctioned features. Also, these traditional provisioning techniques typically cannot occur outside of the manufacturing environment.

There is a need for a feature provisioning system that can handle the competing objectives of differentiating products whilst minimizing the effect of differentiation on inventory management, as well as to provide a vendor or other entity with secure control over the features that can be added to or enabled/disabled in a particular device, platform or system. Such a system that can also enable secure provisioning outside of just the manufacturing environment can also bring additional benefits to the IDM and/or the OEM.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
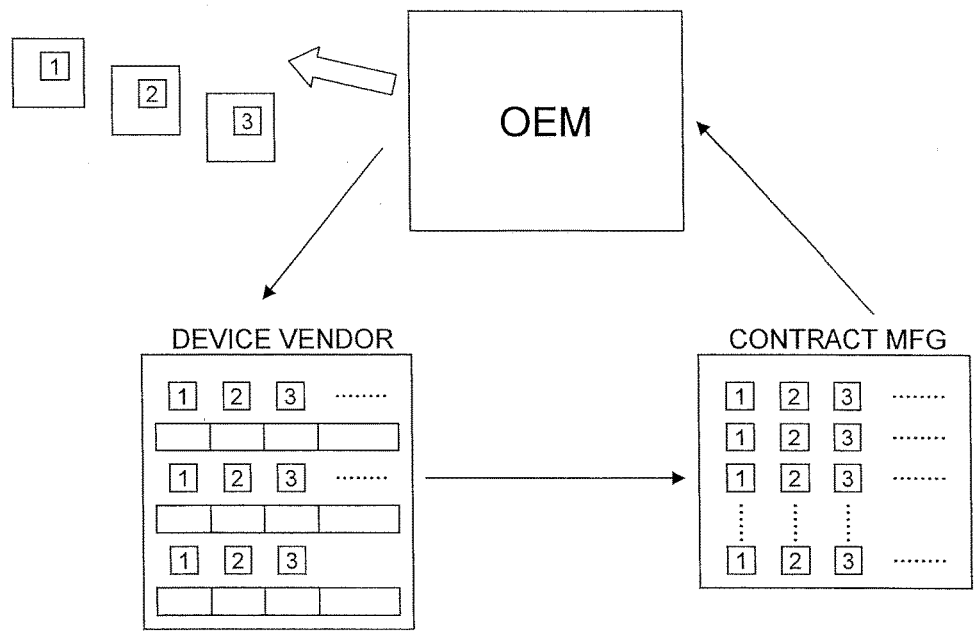
FIG. 1 is a schematic diagram showing a distribution channel with multiple product types having separate inventory streams.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The following describes a method for manufacturers to regain the control of processes and information lost by outsourcing the operations and distribution functions of their enterprise. The result of restoring control is reduced risk and reduced costs in the manufacturing and distribution cycles of their product, while ensuring higher quality. In addition, this method extends the manufacturer's control of the product beyond the sales and distribution of the component, enabling after-market revenue opportunities in which end user companies and individuals can purchase upgrade features directly from the manufacturer.

One example of how the system can be used is in a digital television system-on-chip device where many different unique instances of intellectual property functionality that need to be accounted for and become auditable for per-unit royalty payment purposes. Certain customers of the digital television system-on-chip may wish to enable particular intellectual property within that chip for their digital televisions and pay the associated royalties, while others may not wish to bear this cost. Furthermore, the owners of the intellectual property in question may wish to terminate the digital television system-on-chip manufacturer's use of this intellectual property for contractual reasons. In such cases, a system whereby the system-on-chip manufacturer can activate or deactivate the intellectual property based on chip model, while reconciling the intellectual property owner's ability to assert rights and auditability on the use of the intellectual property, can be particularly useful.

The system described here provides a method to remotely and securely identify, audit and provision an integrated circuit device or trusted device at any time during and after the manufacturing and distribution of the device. This method can be used to prevent counterfeiting by providing a secure and confidential method for generating, storing and authenticating the identity of an individual semiconductor chip or device, and by preventing operation of the device unless it is enabled in an authorized manner. This concept also makes possible a common device or system platform that can be securely provisioned only by the manufacturer at any time during and after the production and distribution of the platform.

Secure provisioning can be leveraged by the manufacturer, at any time during the life cycle of the chip, device or platform, to securely supply and upgrade unique products based on a single platform. The single platform reduces the number of stock keeping units (SKUs) that have to be maintained, tracked, and stored. The cost of producing and distributing a single platform can be amortized over multiple products resulting from this secure provisioning process. In addition, this provisioning can be performed at the last minute before the platform is shipped, thus supporting just-in-time manufacturing of specific SKUs. These capabilities provided by this invention fundamentally simplify many aspects of inventory management, enabling a more efficient supply chain in the outsourced business model.

Of primary importance in the following method is security. Confidentiality and authorization mechanisms can be used to prevent counterfeiting and to provide secure control over feature enablement/disablement. In addition, the ability to create an audit trail of each device through a secure and unique device identifier any time during and after manufacturing and distribution provides counterfeit detection. The additional flexibility provided by secure provisioning prevents the possibility of unauthorised upgrades from 'lower end' devices to 'higher end' devices. The security properties of this method can be used by the manufacturer to re-establish control and enforce ownership of the identity, intellectual property and value of the semiconductor device or system platform in an outsourced environment.

By using the flexible device platform as discussed above, a manufacturer or vendor is able to reduce product SKUs, decrease inventory, and minimize the cost of manufacturing. Although a different number of features can be provided on the same device platform, there is an underlying need to protect the device manufacturer's intellectual property and corresponding revenue premium associated with each feature. The ability to prevent unauthorized enablement of device features, while at the same time providing a single device platform to multiple products, is desirable to the device manufacturer.

Figure 2:
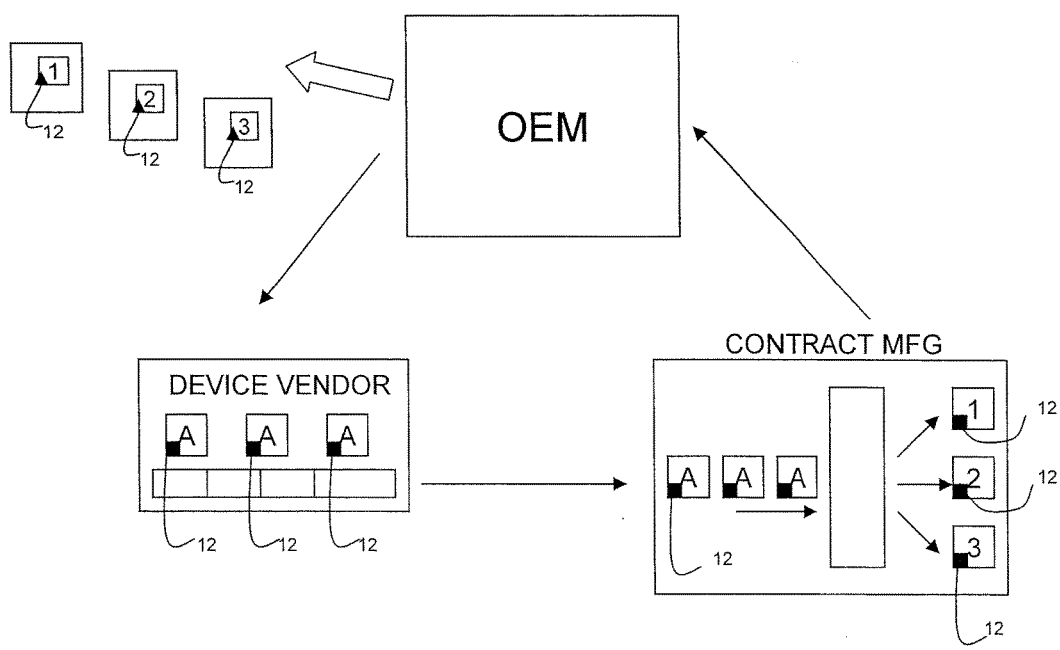
FIG. 2 is a schematic diagram showing a distribution channel with multiple product types coming from a single inventory stream.

In order to provide the flexibility of having single inventory streams that ultimately produce distinct products (e.g. of different grades or sophistication), and to provide the ability to enable, disable (either partially or fully), or to re-enable, it has been recognized that trust between the entities participating in the upgrades or enablement/disablement process needs to be established. To facilitate this remotely and securely, a highly tamper resistant point of trust in the system that is being produced needs to be present. As a result, the more efficient distribution system shown in FIG. 2 can be used, where the point of trust is denoted by numeral 12. Through either a provisioning process or at later stages, i.e. subsequent to installation, manufacture, assembly, sale, etc.; the point of trust hereinafter referred to as a feature controller (FC) 12 is provided with a feature set (or updated feature set) that, when validated, is used to enable or disable entire features or to activate portions of the feature (e.g. 50% power or speed). Hereinafter, the term 'feature set' refers to any set of data, information or instructions for disabling, enabling, activating, deactivating, upgrading, degrading, partial activation, partial deactivation, temporal control etc. In this case, 'partial' means that a feature is either upgraded/downgraded to/from its full capability.

Figure 3:
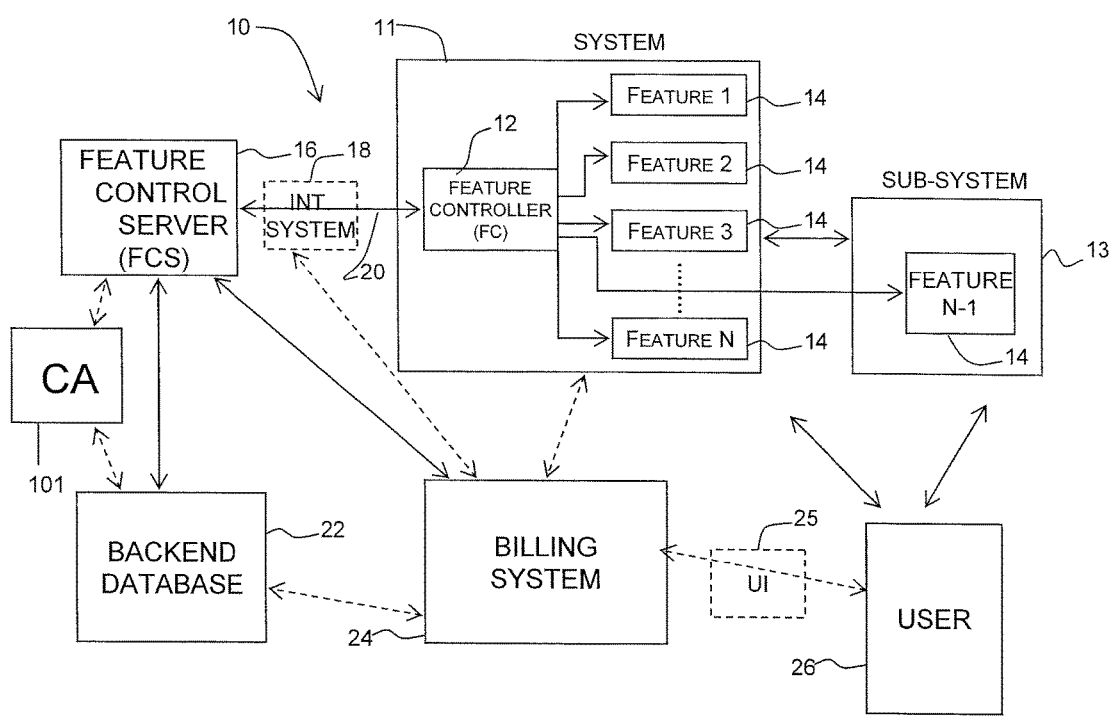
FIG. 3 is a schematic diagram of a system for controlling features on a system.

Turning now to FIG. 3, a feature control system 10 is provided that includes several entities that may be involved in facilitating the control of features using the FC 12. As can be seen in FIG. 3, the FC 12 is part of a system 11 that may also include a sub-system 13. Therefore, the FC 12 can be responsible for any system or hierarchy of systems in any configuration and in any location. Although shown inside of the system 11, the FC 12 can be a separate component or feature and need not reside with the features 14 being controlled. It will be appreciated that system 11 refers to any device, component, product, module, or true system combining hardware, software and other components. In the example shown, the system 11 includes features 1, 2 and 3 up to feature N where feature N−1 resides in the sub-system 13. In practice, the system 11 could be a main processor with the sub-system being an auxiliary feature on the same board but controlled by or cooperating with the main processor. The control of the features 1-N (e.g. which ones to activate) is dictated by a feature set (FEAT) 40, which contains information indicating which one or more features are to be upgraded/degraded (fully or partially), activated/deactivated etc.

The FC 12 is the point of trust between the system 11 and sub-system 13 (if applicable) and a feature control server (FCS) 16. The FCS 16 is typically remote to the FC 12 and may be located at a manufacturing or testing facility, the point of sale and/or service for the system 11 or at any vendor that is deemed responsible for metering out permissions to activate or deactivate features by producing and sending the feature set FEAT 40. The FCS 16 can be any system that is capable of controlling the distribution and injection of sensitive information into a device. A particularly suitable type of system is a key injection system such as that described in co-pending U.S. application Ser. No. 11/450,418 filed on Jun. 12, 2006, the contents of which are incorporated herein by reference. Such a key injection system can be used to remotely monitor device registration and to meter the injection of unique and immutable information into the device. The FCS 16 also includes a cryptographic unit or processor, which is configured to perform any necessary cryptographic operations such as key generation, key agreement, signature generation, signature verification, encryption, decryption etc.

There can be one FCS 16 as shown in FIG. 3, or a hierarchy of FCS units 16 through which commands to the FC 12 flow. As shown in FIG. 3, the FCS 16 may communicate and connect with the FC 12 through an intermediate system 18, e.g. a testing bench, manufacturing line, retail outlet, website, kiosk, wireless system etc. The FCS 16 communicates with a backend database 22, which stores information related to each system 11 such as a unique identifier (UID) as well as cryptographic keys and copies of messages or codes that are used by the FC 12 to control the features 14. The backend database 22 can also contain information used by the FCS 16 to meter out credits to qualified vendors that wish to provision or upgrade many systems 11.

The backend database 22 may be a separate entity as shown or may instead be integrated with the FCS 16 and may operate online, offline or a combination of both. A billing system 24 is typically also present, in order to enable different vendors and users to purchase upgrades or if necessary, to deactivate or degrade certain features and may also be either online or offline or a combination of both. Such upgrades and degradations can initiate on/off of features 14, change in percentage of a feature's capabilities, add or remove portions of capability etc. Each message or code can be absolute or can be temporal, e.g. for trial periods, peak vs. low periods etc. The billing system 24 allows a vendor or OEM to collect revenue from the activation and deactivation and allows the user or other vendors to purchase, upgrade and otherwise customize the system 11 on an as-needed basis. The point of trust provided by the FC 12 facilitates the exchange of feature control for a fee or credit. Also shown in FIG. 3 is a user 26. The user 26, who owns, operates or is otherwise responsible for the system 11 (and sub-system 13), can purchase upgrades after the fact by having the FC 12 in the system 11 and can optionally pay for the upgrades through the billing system 24. The backend infrastructure, in particular the backend database 22 typically communicates with or has a trusted CA 101 that issues digital certificates for use within the scheme.

After-market purchasing by the user 26 can be done through a user interface (UI) 25 to the backend system, e.g. through the billing system 24, the FCS 16, the backend database 22 or any combination of these entities. The UI 25 may be web-based, telephone-based and may even utilize a kiosk or third party vendor. A web-based UI 25, which is preferred for most applications, may be hosted by the manufacturer of the device or system 11 that the user 26 wishes to upgrade or another entity that does this on behalf of the manufacturer.

There may be other user interfaces between entities as necessary, in particular where multiple manufacturing stages are used, so that certain vendors can stipulate what features to program (and when) at the stage for which they are responsible. For example, a hierarchy of FCS units 16 may be used where an independent host, hosts the CA 101, the backend database 22 and billing system 24. A fabless semiconductor vendor would have one of the FCS units 16 and any testing equipment required. This vendor can provide to the independent host, instructions to create specific feature messages and to send them to the vendor, in exchange for payment. This provides a way for the vendor to issue instructions and payment, and for the independent host to process the payment and create and issue the features to the FCS 16 of the vendor. It will be appreciated that the backend system (FCS 16, database 22, billing system 24 and UI 25) can be hosted by the independent host or service or outsourced or collectively run by one of the vendors in the production chain.

Figure 4:
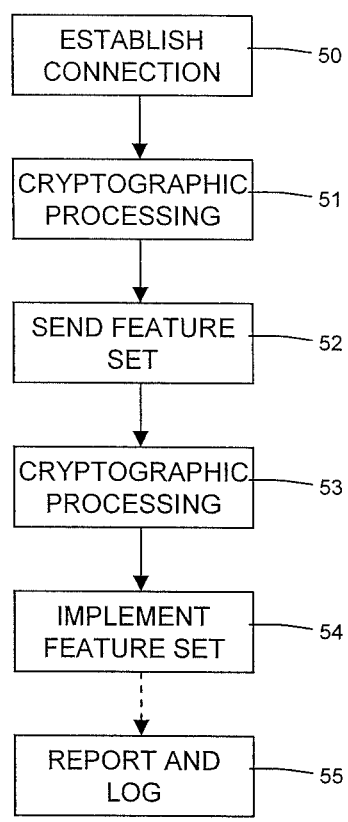
FIG. 4 is a flow diagram illustrating steps taken in implementing feature control on a device or system.

The inclusion of the FC 12 into the system 11 enables provisioning, upgrading, degrading, activating, deactivating, log reporting, temporary activation etc., because FC 12 provides a point of trust in system 11. In order to establish the point of trust, the FC 12 and FCS 16 participate in cryptographically secure exchanges. In some embodiments, where the FC 12 is capable of performing internal key generation from within the system 11, these types of operations can be done securely, remotely and after production/manufacturing. This allows vendors, retailers and users to facilitate and execute the exchange of added value to the system 12 for a fee or to provide a free service. It may be noted that this also allows subscription-type services or temporally-based upgrades to be controlled. This can be used for offering trial periods, pay-per-play or another predetermined arrangement. FIG. 4 shows a flow chart illustrating steps in a basic exchange between the FCS 16 and the FC 12 after backend processing of the feature or feature set has occurred. Such backend processing may include feature command creation, signing and/or encryption and any other processing required to facilitate the steps shown in FIG. 4.

At step 50, a connection is established between the FC 12 and the FCS 16. During manufacture, this can be done through a mechanism for testing, for example a hardware tester for silicon or systems, or custom hardware particular to the application. After sale of the system 11, this can be done at virtually any location using any communications mechanism, e.g. through the Internet, at a kiosk or at a retailer. Preferably there is some form of cryptographic processing performed at step 51. This cryptographic processing may include key agreement, encryption for confidentiality, message authentication code and a signature generation process for authentication. The choice of what type of cryptographic processing to perform depends on the application, e.g. symmetric key vs. asymmetric key.

At step 52, a feature or feature set FEAT 40, once cryptographically processed, is then sent to from the FCS 16 to the FC 12. As discussed below, this would be done after the FCS 16 and FC 12 have optionally verified each other and any keys have been established to permit decryption etc. At the FC 12, further cryptographic processing is then required at step 53 in order for decryption, message authentication, signature verification and other related operations. Once the exchange is verified and the feature set is obtained, the feature set is implemented at step 54. This typically involves setting a feature, turning off a feature, turning on a feature or establishing new time periods or using credits for activating certain features. Optionally, at step 55, a report would be sent back to the FCS 16 to confirm successful implementation of the feature set and may be logged (if desired) by the FCS 16 for auditing, crediting and other purposes.

It may be noted that for each of the preferred embodiments described herein, the actual implementation of the embodiment should be designed to be protected against unauthorized access to secret data store in FC 12 by testing circuits or methods that may probe FC 12 when it is in a non-operational state. An example of this would be when the FC die is undergoing initial testing using scan chains. These scan chains can be used to access the secure memory areas of FC 12. Each of the preferred embodiments described herein should contain specific logic circuits and programming states to prevent access to secure memory once it has been programmed with secret data.

Figure 5:
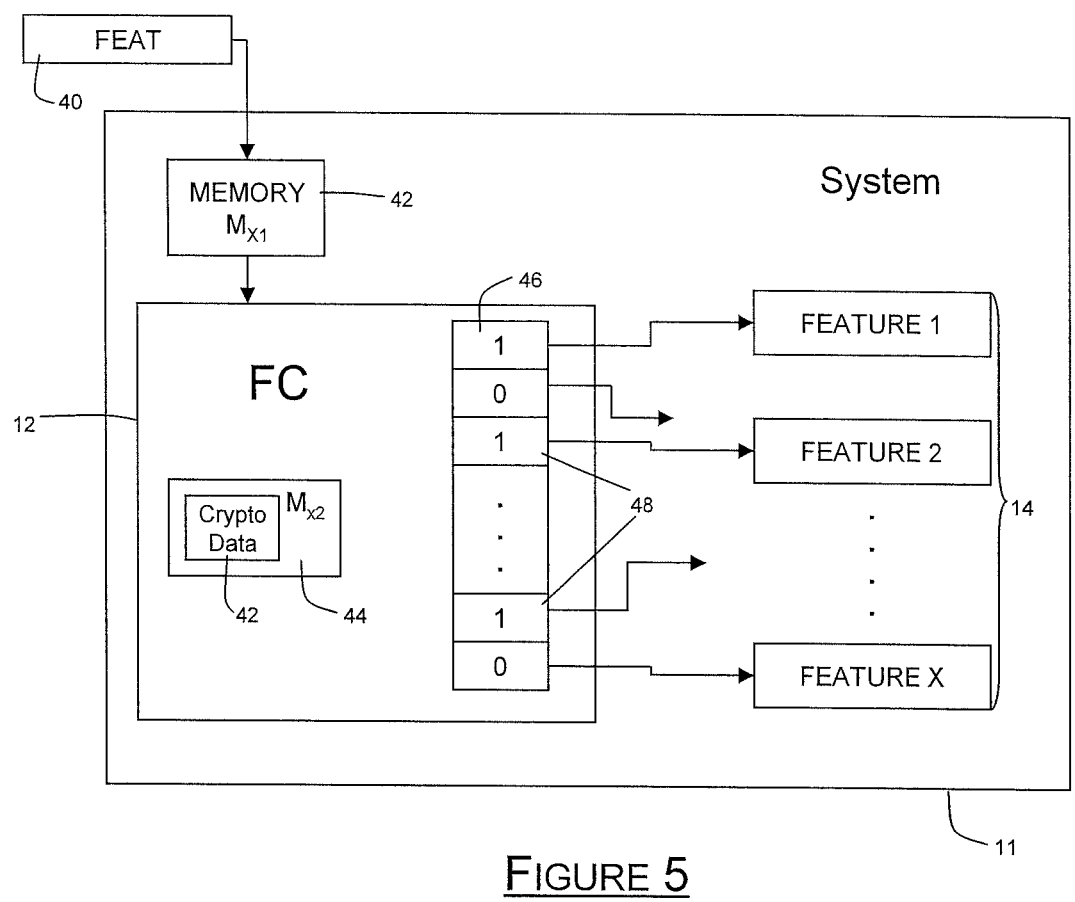
FIG. 5 is a schematic diagram of the feature controller shown in FIG. 3 utilizing a feature register.

The step of implementing the feature set FEAT 40, i.e. step 54 shown in FIG. 4 can be done in many ways. One example is shown in FIG. 5. Turning now to FIG. 5, the feature set FEAT 40 obtained from the FCS 16 can be stored in an arbitrary portion of FC 12's memory $M_{x1}$ 42 such as RAM, a hard disk, etc. The FC 12 can obtain FEAT 40 from $M_{x1}$ 42 when the feature set is to be implemented and access any required cryptographic data 42 from another memory $M_{x2}$ 44. The cryptographic processing 53 may then be applied to FEAT 40 to recover and/or authenticate the feature set. The feature set is implemented in this example by writing to a register 46 to activate, deactivate or otherwise determine how much of a feature to enable or disable. This register 46 may optionally not be part of the FC 12. In a simple example, where features are simply turned on or off, the register can include an array or column of bits 48 as shown in FIG. 5 that are toggled to activate and deactivate a corresponding feature 14. When the system 11 is used, control lines from the register 46 to the specific features 14 will activate those features 14 that have a one written to the corresponding element in the register 46. Alternatively, the system 11 CPU may read the register 46 and determine which features to activate or deactivate.

Another way to implement the feature set FEAT 40 is by executing a feature set mask according to a memory map 164.

Figure 6:
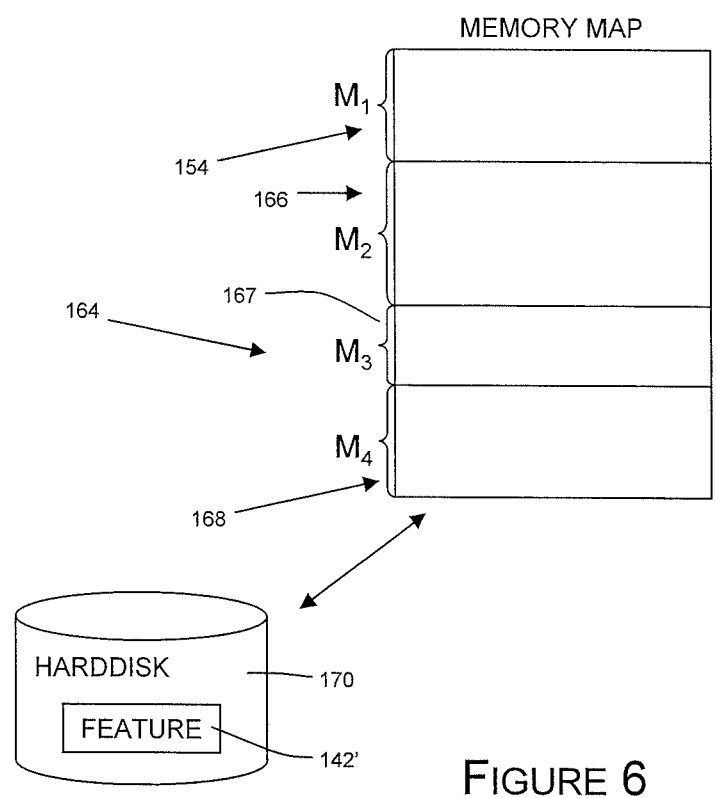
FIG. 6 is a schematic diagram of a memory map for the system and sub-system shown in FIG. 3.

Turning now to FIG. 6, a memory map 164 in the system 11 is shown. This memory map 164 may be a representation describing a single contiguous memory, or it may be a representation of a conglomeration of different types of memory in different physical and/or logical locations, inside the system (e.g. inside a chip and/or inside a chip package), represented in a unified and logical fashion. In FIG. 6, arbitrary memory portions $M_1$, $M_2$, $M_3$ and $M_4$ are shown for illustrative purposes only. The memory map 164 in the example may be of any physical type of memory. This may include, without limitation, read-only memory (ROM), one-time programmable memory (OTP), non-volatile random access memory (NVRAM), or volatile random access memory (RAM). For example, in FIG. 6, a specific example could include three types of memory, with OTP being the first type ($M_1$), NVRAM being the second type ($M_2$ and $M_3$), and RAM being the third type ($M_4$). However, in practice, there may be as few as one memory type, and as many as are required by an arbitrary application that will fit within the chip 112 in question.

The memory map 164 is accessed by the FC 12. The FC 12 can read from and/or write to the memory map 164 as well as interpret the contents of the memory map 164 according to the requirements of each participant in the manufacturing and use of the system 11 and with respect to hierarchical requirements from points upstream and/or downstream in the chain. The FC 12 would also control the access to the memory map programming, by other logical functions through operational and test modes within and outside the device such as, but not limited to, memory and logic BIST test modes, JTAG boundary scan test mode, ATPG scan chain tests, clocking and reset mechanisms. FC 12 may also perform optional cryptographic functions such as random number generation, hashing, symmetric and asymmetric cryptography, digital signing and verification, and message authentication.

Figure 7:
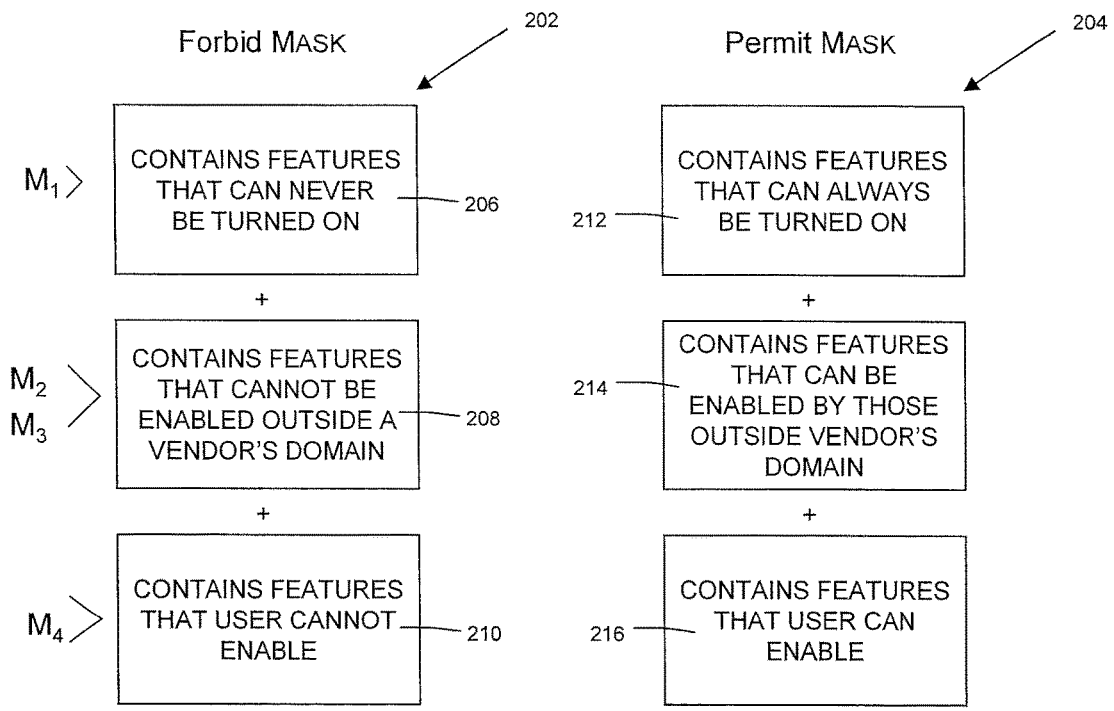
FIG. 7 is a schematic diagram showing forbid and permit masks stored in memory on the device containing permissions for enabling and disabling features.

The contents of the memory map 164 may include one or more of the following elements: information for the controller regarding how to treat the contents of the memory map (either explicitly or through the structure of information contained), feature set "mask" information as in FIG. 7 that indicates whether to permit or forbid a particular operation both at the time of insertion or in subsequent update operations performed at different points within the manufacturing process and/or use of the system 11, and cryptographic and authentication information. After programming, the memory map information is read and interpreted by the FC 12 to be able to interpret the forbid and permit masks contained in the device each time the device is booted. The FC 12 does this in such a way that the device is placed into the operational state permitted by the existing memory map 164, and facilitating updates where and when required.

Turning now to FIG. 7, the use of feature set masks is shown. Each box in FIG. 7 represents a memory space where the particular mask is stored on the system 11 itself. A permit mask 204 and a forbid mask 202 can be created, based on the requirements for feature enablement and/or disablement. It can be seen that for memory block $M_1$, a permit mask 212 contains features that can be turned on and a forbid mask 206 contains features that cannot be turned on. In the example shown in FIG. 7, $M_2/M_3$ have a permit mask 214 and a forbid mask 208 and $M_4$ has a permit mask 216 and a forbid mask 210. For a permit mask 212, 214, 216 the contents may be as simple as single binary bit controlling the enable bits to a functional block of logic corresponding to a feature, or more complex in the form of binary digits that correspond to numerical offsets that are read by the functional block of logic corresponding to a feature, or as complex as the firmware or logic configuration of the functional block of logic corresponding to the feature being permitted. For a forbid mask 206, 208, 210, the contents may be as simple as a single binary bit controlling the disable bits to a functional block of logic corresponding to a feature, or more complex in the form of binary digits that correspond to numerical offsets that are read by the functional block of logic corresponding to a feature, or as complex as the firmware or logic configuration of the functional block of logic corresponding to the feature being permitted.

Priority for which forbid masks and permit masks for each FC 12 in system 11 should be a concatenation of information in the permit and/or forbid masks in such a way as to logically prioritize whether the forbid or permit for each feature should take precedence. The specific choice of whether the information is appended to a portion of the permit mask or forbid mask, and whether different memory blocks may take precedence over other memory blocks (e.g. $M_2$ over $M_1$, or $M_1$ over all others), may remain specific to each implementation of FC 12 but should be recognized consistently by all components that deal with FC 12 in the system. Furthermore, the control information may contain logically contextual information such that the Permit Mask 204 and the Forbid Mask 202 are reconciled against each other in a Boolean logic and/or Boolean arithmetic fashion when both forbid and permit features pertain to any specific feature or features, and provide priority within a given memory block as well as against other memory blocks as initially permitted by $M_1$ and subsequently permitted in an arbitrary selection of other memory blocks.

In one typical example, where memory block $M_1$ is OTP memory (i.e. 'one-time' programmable), this mask would be set at the time of manufacture, although in practice $M_1$ would be any type of memory that is specific to the requirements of the entities manufacturing the system 11 (and sub-system 13 if applicable). $M_1$ may be set to retain priority control over others based on the appended control bits to the Forbid Mask or Permit Mask because the FC 12 associated with that memory block $M_1$ is retained under the control of the owner of the particular FC 12. Where $M_2$ and $M_3$ are NV memory, the permit mask 214 would specify features that can be enabled outside of a vendor's domain and the forbid mask 208 would specify features that cannot be enabled outside of a vendor's domain, and whose control is defined by the appended control information in each memory block. Similarly, where $M_4$ is RAM, the permit mask 216 would specify the features that the user can enable, and the forbid mask 210 would specify features that the user cannot enable. The feature set is the logical intersection of the permit masks and the forbid masks (conceptually the sum of the permit masks–sum of the forbid masks). This configuration enables the participants associated with each memory type to provide a mask that defines which features can be turned on or off (or partially on or partially off) and at which stage of the production process.

Figure 8:
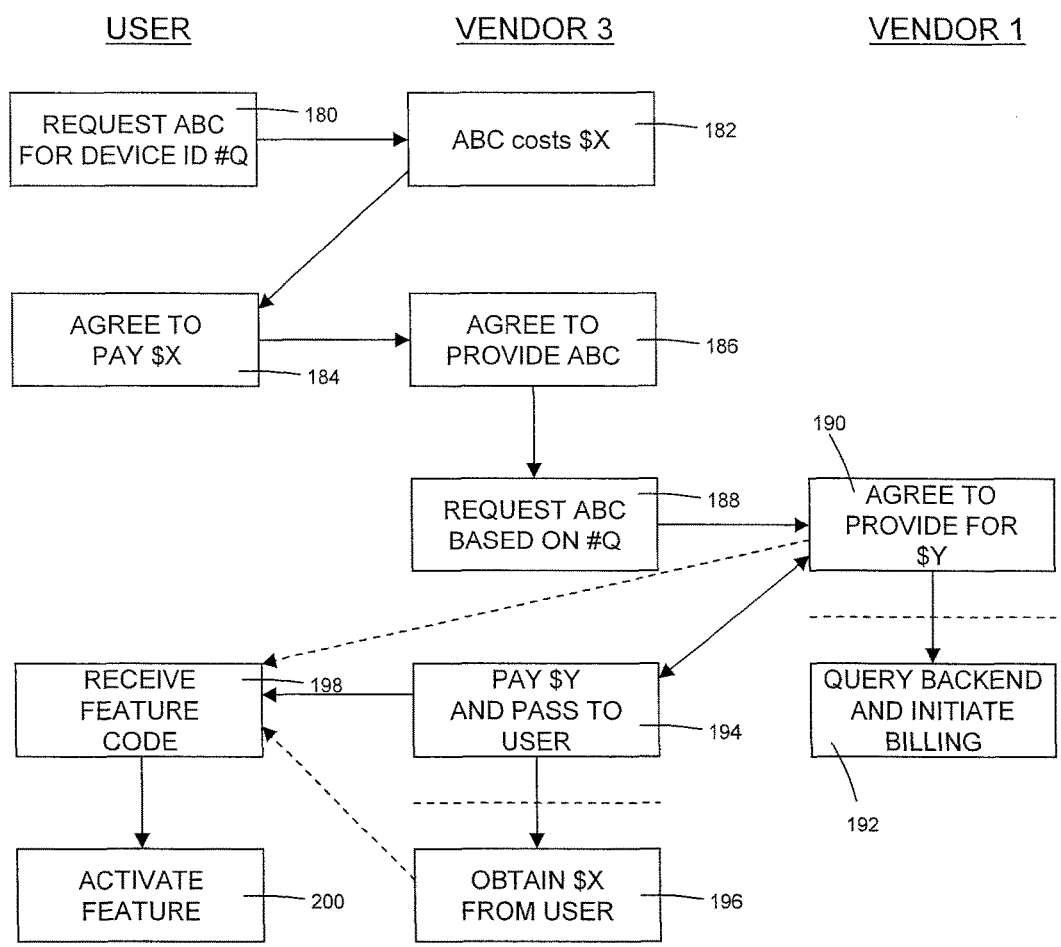
FIG. 8 is a flow diagram showing a procedure for upgrading the system of FIG. 3.

It can be seen that the point of trust provided by the FC 12 enables both provisioning of features at manufacture time and after-market activation and deactivation of features, e.g. where a user 26 purchases an upgrade or where a free trial is purchased for a specific amount of time and then deactivated thereafter. Turning now to FIG. 8, an example showing an after market purchase is provided.

The overall system 10 shown in FIG. 3 enables the user 26 to request, to pay for, and to obtain a new feature set FEAT 40, which enables their system 11 to be upgraded. An exemplary scenario is shown in FIG. 8. At step 180, the user 26 requests that an arbitrary feature ABC for device ID Q be activated, by communicating with vendor 3, who may be the entity that sold the system 11 to the user 26. The device ID Q identifies the actual device or system 11, which is requested to be updated. As explained above, Q would be stored in the backend database 22 as a unique identifier (UID). Upon receiving this request, Vendor 3 would, at step 182, determine that ABC costs $X. This is communicated back to the user 26. If the user 26 accepts this price, they then agree to pay $X to Vendor 3 for activation of feature ABC at step 184. Upon trusting that the user 144 will pay $X (or upon receiving $X from the user 144), Vendor 3 then agrees to provide feature ABC at step 186. Vendor 3 then requests ABC for device Q from vendor 1 at step 188 who, in this example, is in control of or hosts the backend database 22 and the FCS 16. As such, Vendor 3 would communicate with Vendor 1 for the purpose of obtaining feature ABC, through the FCS 16. It will be appreciated that Vendor 3 may instead act on behalf of the user 26 wherein Vendor 1 would provide the feature set FEAT 40 directly to the user 26 as indicated by the dashed line in FIG. 8.

Vendor 1 would then agree to provide activation of feature ABC for $Y at step 190, which would typically be some fixed price lower than $X. At this point, Vendor 1 would then obtain assurance that Vendor 3 will pay $Y either using the billing system at step 192 or by obtaining payment directly from Vendor 3 at step 194 at which time the FEAT 40 for ABC would be provided. Vendor 3 then obtains $X from the user 26 at step 196, if this has not already been arranged, and then sends the feature code to the user 26. As noted above, FEAT 40 may instead be sent directly to the user 26 by Vendor 1 and the billing sorted out later.

At step 198, the user 44 receives the feature code and at step 200 the FC 12 in the user's system 11 (and sub-system 13 if applicable) is activated as explained above. It will be appreciated that a similar exchange to that shown in FIG. 8 can be performed between any of the parties during the production process at any stage and should not be considered limited to only after-market activation/deactivation. Deactivation of features could also be facilitated within the device in two cases: 1) when the deactivation occurs only in conjunction with other features at the discretion of the activator (and not the user), and 2) when an upstream entity prevents downstream upgrades.

Figure 9:
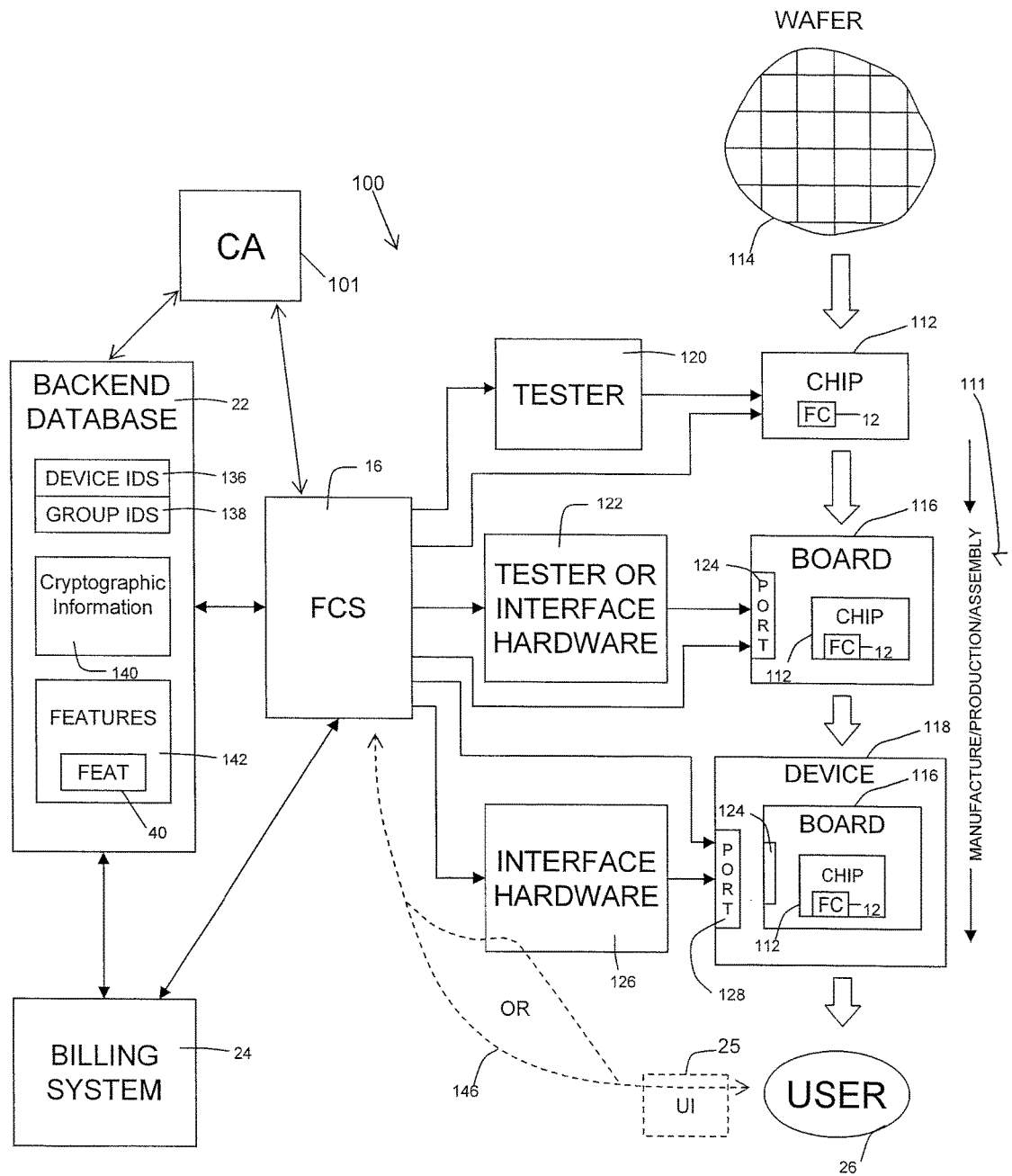
FIG. 9 is a schematic diagram showing a system for enabling and disabling features during manufacture and after-market.

A specific implementation of the system 10 shown in FIG. 3 is provided in FIG. 9, which shows feature enablement/disablement on a silicon chip that is embedded in another device or hierarchy of devices. It will be appreciated that the system 100 can also be configured to use either symmetric or asymmetric key cryptography.

Referring now to FIG. 9, the overall system in this example is denoted by numeral 100. The system 100 enables any entity involved in a design/manufacturing/assembly process (hereinafter referred to collectively as a production process 111) to control and protect the enablement and disablement of features on a part, device or system, in this example, a chip 112. The system 100 also enables users 26 to perform after-market enablement/disablement, e.g. through the UI 25 or the interface hardware 126 provided by the vendor selling the device 118. It can be seen in this example that the FC 12 is included in the chip 112.

In the exemplary production process 111, a wafer of silicon 114 is manufactured, each of which produces a number of chips 112. The wafer 114 is produced at one entity or vendor and may cut the chips 112 at the same facility or deliver the wafer 114 to another vendor, which then cuts the wafer 114 into individual chips 112. It will be appreciated that any of the stages in the production channel 111 can be performed at similar/common entities or vendors and the examples shown herein are for illustrative purposes only.

The chip 112 in this example is then packaged in an integrated circuit package, and then installed onto a board 116 which, in this example, is then installed into a larger device 118, such as a personal computer or other electronic device. The chip 112 can be programmed to have certain features enabled and/or disabled at any one or more stages during the production process 111. A few examples are shown in FIG. 9. The chip 112, once produced, undergoes a testing process, at which time it is typically connected to a tester 120. The tester's connectivity with the chip 112 at this time can be utilized in order to active or deactivate the features, depending on the relationship between the entity having control over the process and ownership of the intellectual property and potential revenue associated with the features. Similarly, at another stage, when the chip 112 is installed into the board 116, more testing may occur. Tester or other interface hardware 122 may be used to either test or evaluate certain functionality of the board, once populated with the chip 112. This hardware 122 may be connected to the board through a port 124, e.g. compatible with Ethernet, USB, IEEE 1394, Bluetooth etc. It may be noted that in some manufacturing processes, a minimal number of "touches" or contact with the board 116 may be desired or mandated. In such situations, a contactless connection such as Bluetooth would be ideal in order to connect between the hardware 122 and the board 116.

At yet another stage in the production, the board 116 is installed in a larger, more sophisticated device 118. An example would be a graphics or multimedia card (board 116), utilizing a processor (chip 112) that is included in an end-user personal computer (device 118). In this example, the device 118 has its own port 128, which in turn connects to the port 124 or other connection on the board 116, which enables either a proprietary hardware machine 126 to connect with and enable/disable features on the chip 112 through the FC 12 or enables the FCS 16 to communicate directly with the device 118 as shown in FIG. 9.

The tester 120, hardware 122 and machine 126 are shown only to illustrate that any hardware or software that is capable of connecting to and communicating with the device, product or system (e.g. chip 112) that is to be feature-enabled can be used, at any stage in the process 111. In this way, the interested vendor can be involved in the process and control the activation/deactivation at any stage or even at multiple stages. For example, the interested vendor may wish to only enable features on the chip 112 that are associated with operation of the board 116 at one particular production stage, and then enable features that are associated with or paid for by the end-vendor at another stage to prevent unauthorized cloning or counterfeiting of the end product or device 118.

Once the device 118 is assembled and the necessary features enabled and/or disabled, the device 118 can then be sold to a user 26. As shown above, the system 100 enables the user 26 to later upgrade their device 118 by purchasing additional features (see FIG. 8) and having system 100 activate them. The connectivity provided by any one or more of the equipment 120, 122 and 126 is ultimately controlled by the interested vendor using the FCS 16 or a hierarchy of FCS units 16 (not shown).

Similar to the example shown in FIG. 3, the FCS 16 uses a back-end database 22, which in this example stores a list of device IDs 136 (such as UIDs) corresponding to the devices that can be controlled or which have been programmed previously; a list of group IDs 138, which can be used to activate or deactivate across a group of similar devices; and a repository of keys or other cryptographic information 140 for performing cryptographic operations in steps 51 and 53, and features 142 that are bundled into corresponding feature sets FEAT 40 as before. The FCS 16 also communicates with or includes a billing system 24, which is used to secure payment in exchange for the desired feature set FEAT 40. The FCS 16 may also communicate directly with the user 26 for the aforementioned feature upgrades that are initiated by the user 26, e.g. through the UI 25.

As discussed above, the cryptographic processing steps 51 and 53 can include any cryptographic operations suitable for the application. In one embodiment, a symmetric key encryption and authentication schemes can be used, where the feature sets FEAT 40 are encrypted and authenticated by the FCS 16 and then decrypted, authenticated, and implemented by the FC 12. It may be noted that where a hierarchy of FCS units 16 are used, the FCS 16 associated with the backend infrastructure would typically do the cryptographic processing and then send the resulting encrypted data to the remote FCS unit(s) 16 as required by the actual configuration of the system 100. Asymmetric key embodiments may also be used to provide authentication and authentication and confidentiality. Examples of such embodiments will now be described. In the following examples, subscript i refers to a specific FC 12 (i.e. $FC_i$) and subscript j refers to a specific FCS 16 (i.e. $FCS_j$).

The FCS 16 controls the distribution of activation and deactivation codes, for enabling and disabling features respectively and in this example is $FCS_j$. In a symmetric key implementation, the feature set is encrypted with a symmetric key $KEY_i$ 140 where again i refers to a specific FC, i.e. $FC_i$. In a symmetric key encryption scheme, the feature set FEAT 40 for $FC_i$ is encrypted and thus represented by $ENC(FEAT_n)$—i.e. the nth feature set FEAT. Similar to the generic examples shown in FIGS. 3 and 9, $FCS_j$ 16 uses a back-end database 22, which in this example stores the device IDs 136 (such as UIDs), a list of group IDs 138 (if necessary), and a repository of symmetric keys $KEY_i$ in the cryptographic storage portion 140, for encrypting features 142 that are bundled into corresponding feature sets and encrypted to provide $ENC(FEAT_n)$. The encrypted feature set $ENC(FEAT_n)$ can ultimately be decrypted on the device, e.g. by $FC_i$ 12 in chip 112 using their copy of the symmetric key $KEY_i$, which has been injected into FC 12 by FCS 16.

Figure 10:
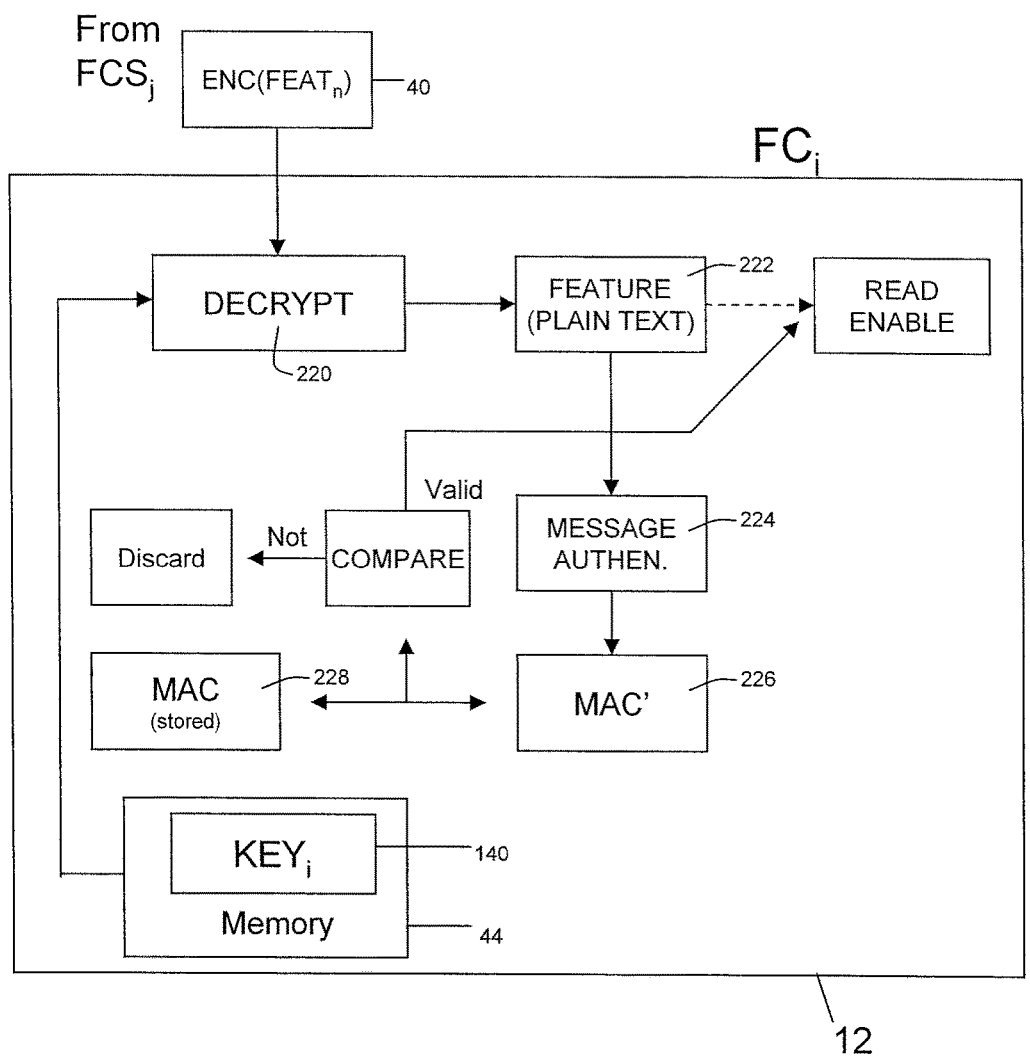
FIG. 10 is a flow diagram showing a message authentication procedure during decrypting of a feature.

The FC 12, in a symmetric key implementation, is shown in greater detail in FIG. 10, i.e. $FC_i$ 12. In this example, the $FC_i$ 12 is configured to decrypt $ENC(FEAT_n)$ and perform message authentication of the received decrypted feature set $FEAT_n$. Message authentication is important to ensure that the encrypted feature message has not been altered (maliciously or by accident). Specifically, in this example, $FC_i$ 12 receives the encrypted feature set $ENC(FEAT_n)$ and obtains its decryption key $KEY_i$ from memory. These are input to a decryption function 220 to obtain a plaintext version $FEAT_n$. This decrypted feature set $FEAT_n$ can then, for message authentication, be input to a message authentication module 224, which generates a message authentication code (MAC') 226. An example of the MAC algorithm would be the AES equipped with cipher-based message authentication code (CMAC) authentication scheme. A separate key ($KEY_j'$) may be used for this calculation depending on the implementation. The MAC' 226 is then compared to a MAC 228 stored in or carried by the received feature set $FEAT_n$. If they match, then the plaintext feature set $FEAT_n$ recovered by the $FC_i$ 12 is verified.

The message authentication process is typically performed, without limitation, in one of three ways. In one implementation, $FEAT_n$ is sent in plaintext with the MAC 228. A datagram would be constructed which includes an openly-readable plaintext message concatenated to a MAC of the plaintext message with an authentication strength being determined by the MAC. In the recovery process, the MAC 228 would be validated and, depending on the validation, the plaintext message (i.e. $FEAT_n$) would either be used in the device or discarded.

In a second implementation, the feature set is sent as ciphertext $ENC(FEAT_n)$ with the MAC 228. A datagram would be constructed using a concatenation of an encryption of the plaintext message with a MAC of the plaintext message, or by encrypting the concatenation of a plaintext message with the MAC of the plaintext message, or by concatenating an encryption of the plaintext message with a MAC of the encryption of the plaintext message. In all cases of this second implementation, the plaintext should be hidden from plain view by generating its corresponding ciphertext. The authentication message has a strength equivalent to the length of the message. The plaintext message would be recovered using a decryption operation on all cipher texts and a subsequent validation of the MAC 228 which, depending on the decryption and the MAC validation, would cause the plaintext message (i.e. $FEAT_n$) either to be used or discarded.

In a third implementation, ciphertext-only is used, wherein a datagram is constructed using the encryption of the concatenation of the message and an arbitrary redundancy. The plaintext message would be recovered using a decryption operation on the datagram and a validation would then be performed on the redundancy such that it matches an expected value. This would cause the accompanying plaintext message (i.e. $FEAT_n$) to, depending on the validation, either be used or discarded.

Figure 11:
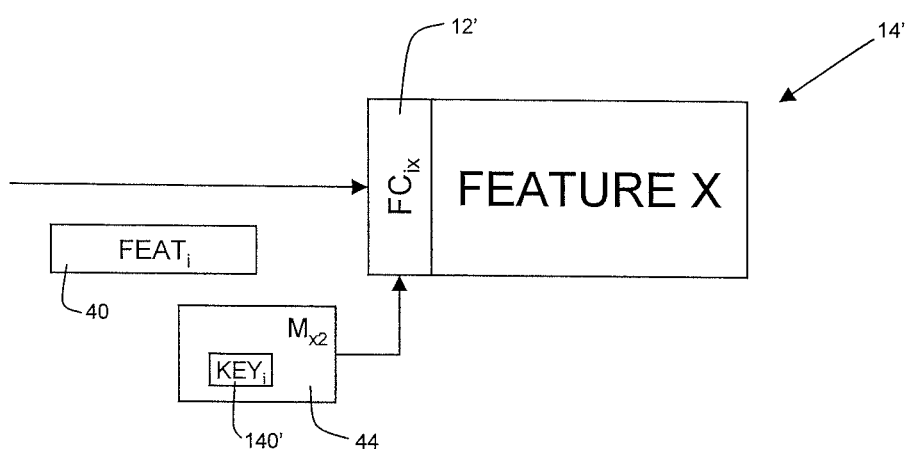
FIG. 11 is a schematic diagram of another embodiment of the feature controller.

As shown in FIG. 11, for such symmetric key embodiments, any one or more of the features 14 (arbitrary Feature X shown in FIG. 11) may include its own $FC_{ix}$ 12 that obtains the same feature set $ENC(FEAT_n)$ as the $FC_i$ 12 does in FIG. 10, and decrypts $FEAT_n$ from $ENC(FEAT_n)$ using the symmetric key $KEY_i$ 140 as before. The status/implementation of Feature X (e.g. whether to turn on or turn off Feature X) can be determined from the decrypted feature set $FEAT_n$. In this way, the supplier of the feature is in control of the feature enablement or disablement (or partial enablement or disablement) rather than only the supplier of the chip 112.

It will be appreciated that the configuration shown in FIG. 11 can also be used in an asymmetric key embodiment, where asymmetric cryptography is used to protect the integrity of $FEAT_n$ and alternatively to perform key management functions to establish a shared key between $FCS$ 16$_j$ and FC 12$_i$, so that $FEAT_n$ may be encrypted when sent from FCS 16 to FC 12. The FC 12 would then pass the feature along to Feature X to decrypt it. It will be appreciated that although the use of symmetric cryptography to encrypt the feature set is preferred due to efficiency, asymmetric cryptography can also be used if preferred or more suitable to the application.

Figure 12:
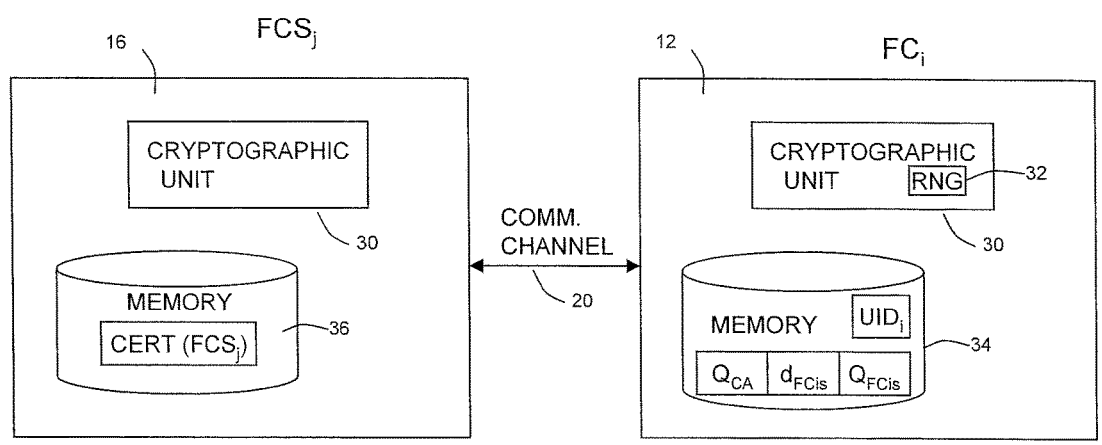
FIG. 12 is a schematic diagram of another embodiment of the feature control server (FCS) and feature controller (FC) shown in FIG. 3.

The FCS 16 and FC 12 for an asymmetric key embodiment, are shown in greater detail in FIG. 12. An arbitrary $FC_i$ and $FCS_j$ are shown. The $FCS_j$ 16 includes a cryptographic unit 30, which is configured to perform any necessary cryptographic operations such as key generation, key agreement, signature generation, signature verification, encryption, decryption etc. The $FCS_j$ 16 may also act as or communicate with the certification authority (CA) 101. The $FCS_j$ 16 also includes a memory 36 for storing information and data used in communicating with the FC 12. As shown, the $FCS_j$ 16 stores a certificate $CERT(FCS_j)$. $FCS_j$ may also store a certificate (i.e. $CERT(FC_i)$) corresponding to each system i that has its own $FC_i$ 12 and thus includes the point of trust. The memory 36 may also include the backend database 22 or portions thereof if the backend database 22 is on-site. The $FCS_j$ 16 communicates with the $FC_i$ 12 over a communication channel 20 which can be secure, insecure, wired, wireless, wide-area, local-area and any other type of communication link that enables the transfer of data between the $FCS_j$ 16 and $FC_i$ 12.

The $FC_i$ 12 has a cryptographic unit 30 which is configured to perform the necessary cryptographic operations at the system 11 side of the upgrade/degrade procedure. For example, the unit 30 may include a random number generator (RNG) 32 as well as a CPU, elliptic curve (EC) arithmetic unit, Advanced Encryption Standard (AES) core, ROM, SRAM and other types of memory units. In one example described below, the unit 30 is an ECC module capable of executing ECDSA, ECMQV protocols or both. The $FC_i$ 12 also has a memory 34 for storing data and information. The $FC_i$ 12 stores a corresponding $UID_i$ that distinguishes the actual system 11 from other systems of similar type, brand or version. This $UID_i$ may be either a unique or statistically-unique number that is locally generated in $FC_i$ 12, or inserted using external equipment such as the $FCS_j$ 16. The $FC_i$ 12 also stores a long term or "static" private key $d_{FCis}$ and a public key $Q_{FCis}$ which, as will be described and exemplified below, are typically generated at the time of manufacture and are usually linked to the $UID_i$.

Specifically, $Q_{FCis}$ or a portion of it may be used as the $UID_i$. $FC_i$ 12 also stores the public key $Q_{CA}$ of the CA 101. It will be appreciated that the memory 34 can be of any type or combination of types and can be configured to store any information necessary to permit the FC 12 to operate as intended.

Figure 13:
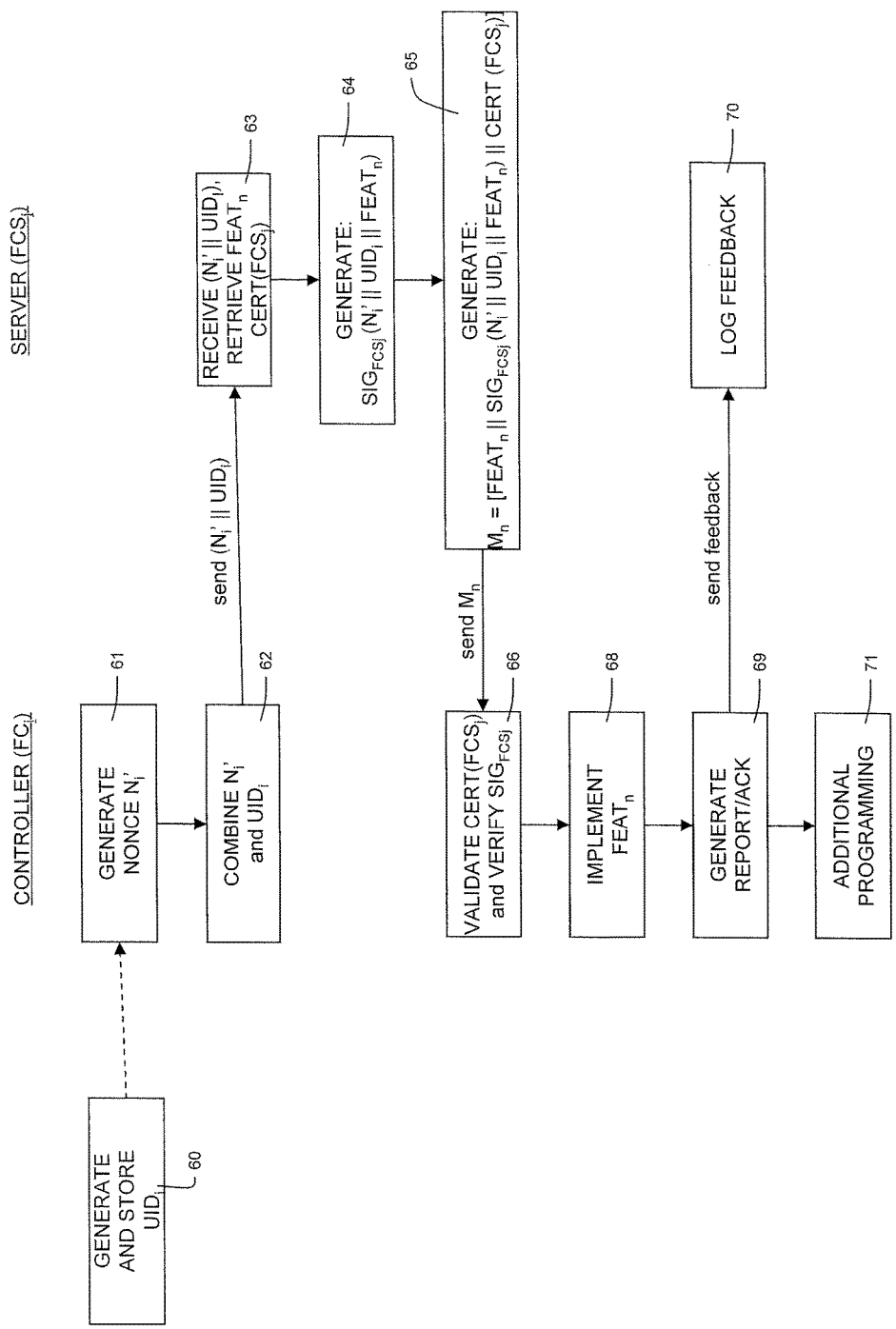
FIG. 13 is a flow diagram illustrating an example protocol for implementing feature control including authentication.

The feature set that is sent to the $FC_i$ 12 in an asymmetric embodiment should include authentication and should be protected against attacks such as forgery, replay and substitution. One example protocol for providing authentication is shown in FIG. 13. An initial command from the $FCS_j$ to the $FC_i$ to "initiate programming" may first be generated. The $UID_i$ for $FC_i$ is generated either by $FC_i$ or injected by $FCS_j$ at step 60, which is typically at some earlier time such as during the manufacturing process. This may include a command from $FCS_j$ to $FC_i$ to cause $FC_i$ to generate the $UID_i$. Typically, $UID_i$ will not change for the life of $FC_i$. At step 61, when $FC_i$ wishes to communicate with the $FCS_j$ in order to obtain a new feature set, a nonce, $N_i'$, is first generated, where the "'" indicates a per session value. This nonce $N_i'$, which is unique per feature programming command, is then combined with the $UID_i$, e.g. by concatenation ($N_i'\|UID_i$) and sent to $FCS_j$. $FCS_j$ upon receiving ($N_i'\|UID_i$) at step 63 then begins the preparation of a programming message $M_n$ (i.e. nth message M) and, in order to do so, retrieves the requested or otherwise appropriate feature or feature set $FEAT_n$ as well as the certificate for $FCS_j$, namely CERT ($FCS_j$).

At step 64, the FCS 16 then generates a signature using the information provided by $FC_i$ and the feature set, e.g. $SIG_{FCSj}(N_i'\|UID_i\|FEAT_n)$. Preferably, but without limitation, the signature is an ECDSA, ECNR or ECPVS signature using an ECC key pair that has been certified by the backend infrastructure's CA 101 that issues digital certificates for use within this scheme. The programming message may then be assembled at step 65 using the signature, the feature set and the certificate of $FC_j$, e.g. where:

$M_n$=[$FEAT_n\|SIG_{FCSj}(N_i'\|UID_i\|FEAT_n)\|CERT(FCS_j)$]

If a symmetric key ($KEY_i$) has been previously injected and is available as described above, $FEAT_n$ can be encrypted for confidential messages. It can be seen that from this message $M_n$, $FC_i$ will be able to decrypt the encrypted $FEAT_n$ (if this option is used), extract the feature set, the signature (in order to verify it) and the certificate. The message $M_n$ is then sent to $FC_i$.

Upon receipt of $M_n$, at step 66, $FC_i$ validates the certificate $CERT(FCS_j)$, e.g. using the public key of the backend infrastructure's CA 101 programmed in a non-volatile manner and accessible to $FC_i$ 12. There may be a customer ID that has also been programmed in a non-volatile manner, which can also be checked at this step. In this example, $FC_i$ then verifies $SIG_{FCSj}$ and in doing so verifies that $N_i$ and $UID_i$ match its own values. If any of the checks fail in step 66, the $FC_i$ would abort the operation.

If the checks in step 66 are valid, $FC_i$ then implements the feature or features included in the feature set $FEAT_n$ at step 68. After implementing $FEAT_n$ at step 69 $FC_i$ should prepare a report or acknowledgement by including a success or failure message. This acknowledgement or feedback is then sent to $FCS_j$. It may be noted that to avoid replay attacks where the feedback message is replayed to fool $FCS_j$ into thinking a system 11 failed to program when it actually did, the response should be cryptographically secured. At step 70, upon receipt of the feedback, $FCS_j$ may then proceed to log the feedback for later analyses such as grey market audits or error tracking. Should any additional programming be required, $FC_i$ can generate a new nonce and the above steps repeated, collectively shown as step 71 in FIG. 6.

This exemplary protocol links commands to a specific FC 12 and the commands are enforced. Should a malicious manufacturer have other systems 11 with FCs listening, they would not act on the received commands due to the fact that the commands are linked to a single FC 12. This is accomplished through use of the $UID_i$ and $N_i$ to lock or fix communications to a specific target. Also, the commands from the FCS 16 to the FC 12 (e.g. $FCS_j$ and $FC_i$) are integrity protected, authenticated and protected against replay attacks and spoofing. Because the commands are linked to a specific $UID_i$, $FCS_j$ can keep an audit log showing that a particular $UID_i$ was programmed and where it was programmed. This log can be reported back through the infrastructure in FIG. 3 (or some other infrastructure) to the original manufacturer. Should multiple instances of the same $UID_i$ be detected in a review of these log files, a cloning/counterfeit situation would be discovered.

Figure 14:
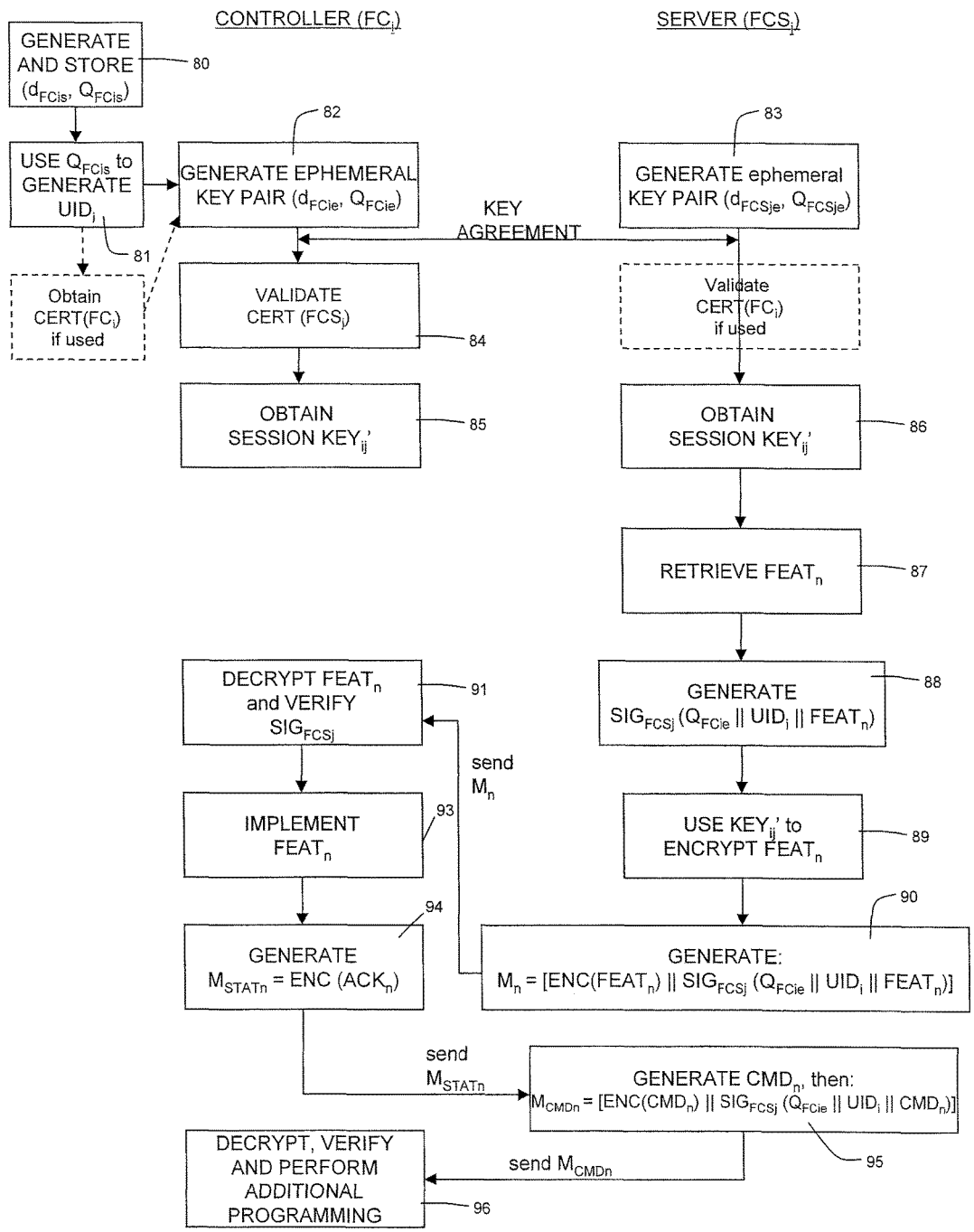
FIG. 14 is a flow diagram illustrating another example protocol for implementing feature control including authentication and confidentiality.

In another, more cryptographically secure embodiment, a protocol providing both authentication and confidentiality can be used as shown in FIG. 14. This protocol does not require a secret symmetric key to be injected into $FC_i$ for it to decrypt data. Similar to above, an initial command from the $FCS_j$ to the $FC_i$ to "initiate programming" may first be generated. For this protocol, $FC_i$ would then generate the static key pair ($d_{FCs}$, $Q_{FCS}$) at step 80, preferably a static ECC key pair, where $Q_{FCs}$ is used to generate the $UID_i$ at step 81. In an ECC implementation, one of the coordinates (preferably the x-coordinate) of the static public key $Q_{FCs}$ can be used as the $UID_i$ with truncation if necessary. The key pair is preferably created and stored at the time of manufacture but can be done at another time based on the application. It should be noted that the static key pair and the UID should be created and stored such that they cannot be altered once programmed.

When $FC_i$ programming is initiated by $FCS_j$, the $FC_i$ first generates an ephemeral key pair ($d_{FCie}$, $Q_{FCie}$) at step 82, preferably an ECC key pair, and participates in a key agreement with $FCS_j$, e.g. for ECC implementations, ECMQV key agreement. As part of this process, if $FC_i$ has a certificate for its static key, i.e. $CERT(FC_i)$, it will send this to $FCS_j$. At step 83, FCS 16 will also generate an ephemeral key pair ($d_{FCSje}$, $Q_{FCSje}$). As part of the key agreement, $FCS_j$ sends the ephemeral public key $Q_{FCSje}$ and the certificate $CERT(FCS_j)$ to $FC_i$. If $CERT(FC_i)$ exists, then a certificate validation must also be performed by $FCS_j$. At step 84, $FC_i$ validates the certificate $CERT(FCS_j)$ and the result of the key agreement is a shared key $KEY_{ij}'$ between $FCS_j$ and $FC_i$ at steps 85 and 86. As before, if a customer ID is mask programmed, that value is checked by the $FC_i$. If either of the checks fails, the $FC_i$ would abort the operation. If this value is used, it is also sent to the $FCS_j$ by $FC_i$ for verification that the $FC_i$ should be programmed.

$FCS_j$ then begins the preparation of a programming message $M_n$ and, in order to do so, retrieves the requested or otherwise appropriate feature or feature set $FEAT_n$ at step 87. At step 88, $FCS_j$ then generates a signature using the information provided by $FC_i$ during the key agreement and the feature set, e.g. $SIG_{FCSj}(Q_{FCie}\|UID_i\|FEAT_n)$. Preferably, the signature is an ECC signature using an ECC key pair, such as ECDSA, ECNR or ECPVS. In the signature, $Q_{FCie}$ may be truncated if desired. The feature or feature set $FEAT_n$ is then encrypted at step 89 to provide confidentiality using a symmetric cipher and the key $KEY_{ij}'$ established during key agreement.

The programming message $M_n$ may then be assembled at step 90 using the signature and the encrypted feature set, e.g. where:

$M_n$=[ENC(FEAT$_n$)∥SIG$_{FCSj}$(Q$_{FCie}$∥UID$_i$∥FEAT$_n$)].

The message $M_n$ is then sent to FC$_i$. Upon receipt of $M_n$, at step 91, FC$_i$ decrypts the feature set FEAT$_n$ using KEY$_{ij}$' and verifies the signature. As part of the signature validation, FCi validates that Q$_{FCie}$ and UID$_i$ matched its own values. If any of the checks fail in step 91, the FC$_i$ would abort the operation.

If the checks in step 91 are valid, the FC$_i$ then implements the feature or features included in the feature set FEAT$_n$ at step 93. After performing the actions associated with FEAT$_n$, FC$_i$ then returns a success or failure message to FCS$_j$. This message can be an encrypted acknowledgement message, e.g. M$_{STATn}$=ENC(ACK$_n$) generated at step 94. ACK$_n$ is one of two highly redundant messages indicating either success or failure. Redundancy would be required if there is no message integrity. This message also needs to be protected against replay, which can be done using any suitable solution. The message M$_{STATn}$ is then sent to the FCS$_j$. Should any further programming be required, at step 95 FCS$_j$ can sign a command CMD$_n$, e.g. by generating a message M$_{CMDn}$ at step 95 where:

M$_{CMDn}$=[ENC(CMD$_n$)∥SIG$_{FCSj}$(Q$_{FCie}$∥UID$_i$∥CMD$_n$)].

This message should be protected against replay.

If the further programming occurs after the FC$_i$ has been powered down and/or if the ephemeral keys have been erased, the FC$_i$ can generate a new ephemeral key pair and repeat the process shown in FIG. 14. The message M$_{CMDn}$ is sent to FC$_i$ and at step 96, the message M$_{CMDn}$ is decrypted, the signature verified and the additional programming included in the message M$_{CMDn}$ performed.

The protocol shown in FIG. 14 includes the benefits of the protocol in FIG. 13 but also provides an encrypted tunnel that is linked to a specific FC 12 and a specific FCS 16. As such, other FCs 12 would not be able to participate in this protocol or decrypt commands sent during an encrypted programming session. Also, it would not be possible to discover the plaintext FC programming commands, which would make an attack on the FC 12 more complicated.

As can be seen from FIGS. 13 and 14, two versions of the exchange between the FCS 16 and an FC 12 are exemplified, i.e. an authentication only version (which may optionally use an injected secret symmetric key for confidentiality) and a version utilizing both confidentiality and authentication and not requiring the injection of a secret symmetric key. The choice of which version is application dependent. For example, the authentication only version may be used to save gates or improve the programming functionality times in order to minimize chip cost and/or test time.

It can therefore be seen that the feature control system 10 shown in FIG. 3 can be adapted to any type of system 11 that allows for product or service differentiation through the features it provides. As exemplified in FIG. 9, the point of trust established through including the FC 12 in the system or hierarchy of systems can be particularly suitable for reducing the number of inventory streams in a silicon chip manufacturing environment. Furthermore, the system 11 (e.g. device 118) can not only be provisioned with a certain feature set, but can also allow for later upgrades, downgrades, time-based trials and many other down-stream capabilities that would otherwise not be possible (or at least not be trusted) without having the cryptographic control over the feature control as described herein.

The systems 10, 100 can include additional capabilities. For example, the FC 12 can be configured to determine if an attacker is trying to hack into FC 12. If so, the FC 12 can shut itself off and possibly shut down the chip 112 or system 11 it is associated with. Another example is to configure the FC 12 to be capable of being remotely instructed to shut off the system 11. Another example includes the manufacturer storing an encrypted program in the memory of system 11, and then later downloading the memory decryption key as from FCS 16 to the FC 12 so that the program cannot be executed until the FC 12 receives the key (as a feature) and decrypts it.

It should be appreciated that FC 12 acts as a point of trusted operation within system 11. Should a device or system already have a device capable of providing similar trusted operation, the backend system and FCS 16 operation and protocols can be modified to use these other versions of FC 12 to provide the feature control features described in this document. Examples of such trusted operation devices include, but are not limited to, the Trusted Computing Group's (TCG) Trusted Platform Module (TPM), and storage devices built in compliance with the TCG Storage specifications.

FC 12, FCS 16, or intermediate system 18 may also be provisioned to assist in preventing man-in-the-middle attacks. One example of such a method involves a combination of one or more of FC 12, FCS 16 and intermediate system 18, making a comparison of time measurements based on deterministic assessment of the time latencies associated with the exchange of information in a particular implementation of FC 12, FCS 16 and intermediate system 18 to the actual measured exchange time latencies. One or more of FC 12, FCS 16, and intermediate system 18 could have a physically-embedded analog delay, such as a resistive-capacitive network or a ring oscillator with known or bounded delay characteristics, or refer to a precision secure-time reference server, to determine if tampering with the man-in-the-middle attack prevention may be occurring. Such an attack may be implemented using an unauthorized intermediate agent between the elements of FC 12, FCS 16, or intermediate system 18, or by slowing the digital input clock or the duty cycle of the digital input clock to FC 12, FCS 16 or intermediate system 18.

Example Information Processing System

The present subject matter can be realized in hardware or a combination of hardware and software. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, which allow a computer to read such computer readable information.

NON-LIMITING EXAMPLES

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method performed at a remote server, the method comprising:
    participating in a public key based key agreement with a feature controller in a device, by performing cryptographic operations using a connection that enables transfer of data between the remote server and the feature controller, to establish a shared key between the remote server and the feature controller;
    storing the shared key and an identifier associated with the device in a memory of the remote server, the identifier being derived from at least a portion of a public key of a static key pair stored in a secure memory in the feature controller;
    encrypting, using a symmetric cipher and the shared key, a control instruction for the feature controller to control features in the device;
    generating a signature using the control instruction and information provided by the feature controller in the device during the public key based key agreement, the information comprising the identifier associated with the device;
    generating a message comprising the encrypted control instruction and the signature; and
    sending the message to the feature controller of the device to thereby securely control features in the device.

2. The method of claim 1, wherein the information provided by the feature controller in the device comprises an ephemeral public key received by the remote server during the key agreement, and the signature is generated using at least the control instruction, the ephemeral public key, and the identifier associated with the device.

3. The method of claim 1, wherein the public key based key agreement comprises an elliptic curve based key agreement.

4. The method of claim 1, wherein the public key based key agreement comprises an elliptic curve Menezes-Qu-Vanstone (ECMQV) key agreement.

5. The method of claim 1, wherein the identifier associated with the device is generated using a static key pair.

6. The method of claim 1, wherein the control instruction comprises feature control programming.

7. The method of claim 1, wherein the control instruction comprises at least one command.

8. The method of claim 1, wherein the identifier is unique to the device.

9. The method of claim 1, wherein the identifier is unique to a group comprising a plurality of devices.

10. The method of claim 1, wherein the message is generated by concatenating the encrypted control instruction with the signature.

11. The method of claim 1, wherein the device is a digital television system-on-chip device.

12. The method of claim 1, wherein the device is an integrated circuit device.

13. A control server comprising:
    a processor; and
    at least one memory, the memory comprising computer executable instructions that when executed by the processor operate the control server to perform the following method:
        participating in a public key based key agreement with a feature controller in a device, by performing cryptographic operations using a connection that enables transfer of data between the control server and the feature controller to establish a shared key between the control server and the feature controller;
        storing the shared key and an identifier associated with the device in a memory of the control server, the identifier being derived from at least a portion of a public key of a static key pair stored in a secure memory in the feature controller;
        encrypting, using a symmetric cipher and the shared key, a control instruction for the feature controller to control features in the device;
        generating a signature using the control instruction and information provided by the feature controller in the device during the public key based key agreement, the information comprising the identifier associated with the device; and
        generating a message comprising the encrypted control instruction and the signature; and
        sending the message to the feature controller of the device to thereby securely control features in the device.

14. A non-transitory computer readable storage medium comprising computer executable instructions for performing operations at a remote server for provisioning features in a device, the operations comprising:
    participating in a public key based key agreement with a feature controller in a device, by performing cryptographic operations using a connection that enables transfer of data between the remote server and the feature controller, to establish a shared key between the remote server and the feature controller;
    storing the shared key and an identifier associated with the device in a memory of the remote server, the identifier being derived from at least a portion of a public key of a static key pair stored in a secure memory in the feature controller;
    encrypting, using a symmetric cipher and the shared key, a control instruction for the feature controller to provision features in the device;
    generating a signature using the control instruction and information provided by the feature controller in the device during the public key based key agreement, the information comprising the identifier associated with the device;
    generating a message comprising the encrypted control instruction and the signature; and sending the message to the feature controller of the device to thereby securely provision features in the device.

15. The computer readable storage medium of claim 14, wherein the information provided by the feature controller in the device comprises an ephemeral public key received by the remote server during the key agreement, and the signature is generated using at least the control instruction, the ephemeral public key, and the identifier associated with the device.

16. The computer readable storage medium of claim 14, wherein the public key based key agreement comprises an elliptic curve based key agreement.

17. The computer readable storage medium of claim 14, wherein the public key based key agreement comprises an elliptic curve Menezes-Qu-Vanstone (ECMQV) key agreement.

18. The computer readable storage medium of claim 14, wherein the identifier associated with the device is generated using a static key pair.

* * * * *